(12) United States Patent
Faubel et al.

(10) Patent No.: US 10,453,470 B2
(45) Date of Patent: Oct. 22, 2019

(54) SPEECH ENHANCEMENT USING A PORTABLE ELECTRONIC DEVICE

(71) Applicant: NUANCE COMMUNICATIONS, INC., Burlington, MA (US)

(72) Inventors: Friedrich Faubel, Ulm (DE); Tobias Wolff, Neu-Ulm (DE); Tim Haulick, Blaubeuren (DE)

(73) Assignee: Nuance Communications, Inc., Burlington, MA (US)

( * ) Notice: Subject to any disclaimer, the term of this patent is extended or adjusted under 35 U.S.C. 154(b) by 26 days.

(21) Appl. No.: 15/534,803

(22) PCT Filed: Dec. 11, 2014

(86) PCT No.: PCT/US2014/069724
§ 371 (c)(1),
(2) Date: Jun. 9, 2017

(87) PCT Pub. No.: WO2016/093834
PCT Pub. Date: Jun. 16, 2016

(65) Prior Publication Data
US 2018/0268838 A1    Sep. 20, 2018

(51) Int. Cl.
*G10L 21/0208*    (2013.01)
*G10L 21/0216*    (2013.01)
(Continued)

(52) U.S. Cl.
CPC ............ *G10L 21/0208* (2013.01); *G06F 3/01* (2013.01); *G06F 3/167* (2013.01);
(Continued)

(58) Field of Classification Search
CPC ....... G10L 21/0208; G10L 2021/02087; G10L 2021/02165; G10L 2021/02166
(Continued)

(56) References Cited

U.S. PATENT DOCUMENTS

| 2010/0081487 A1 | 4/2010 | Chen et al. | |
| 2012/0058803 A1* | 3/2012 | Nicholson | H04M 1/605 |
| | | | 455/570 |

(Continued)

FOREIGN PATENT DOCUMENTS

WO    2011063830 A1    6/2011

OTHER PUBLICATIONS

Extended European Search Report issued in Application Serial No. 14908066.5 dated Mar. 28, 2018.
(Continued)

*Primary Examiner* — David L Ton
(74) *Attorney, Agent, or Firm* — Ohlandt, Greeley, Ruggiero & Perle, L.L.P.

(57) ABSTRACT

A system and method for speech enhancement of a portable electronic device. Embodiments may include receiving an audio signal at a portable electronic device having a first microphone and a second microphone. Embodiments may also include receiving an input from a proximity detector associated with the portable electronic device and controlling a processing component associated with at least one of the first microphone and the second microphone based upon, at least in part, the input from the proximity detector.

20 Claims, 4 Drawing Sheets

(51) Int. Cl.
*G06F 3/01* (2006.01)
*G06F 3/16* (2006.01)

(52) U.S. Cl.
CPC .............. *G10L 2021/02087* (2013.01); *G10L 2021/02165* (2013.01); *H04R 2410/05* (2013.01); *H04R 2499/11* (2013.01)

(58) Field of Classification Search
USPC ........................................ 381/71.2, 71.6, 92
See application file for complete search history.

(56) References Cited

U.S. PATENT DOCUMENTS

| | | |
|---|---|---|
| 2012/0330653 A1 | 12/2012 | Lissek et al. |
| 2013/0022216 A1 | 1/2013 | Ganong, III et al. |
| 2013/0117014 A1* | 5/2013 | Zhang .................... G10L 21/00 704/207 |
| 2013/0201097 A1 | 8/2013 | Pasquero et al. |
| 2013/0295906 A1 | 11/2013 | Chen et al. |
| 2017/0330580 A1* | 11/2017 | Wolff .................. G10L 21/0208 |

OTHER PUBLICATIONS

Jeub et al., "Blind Estimation of the Coherent-to-Diffuse Energy Ratio from Noisy Speech Signals", IEEE, Aug. 29, 2011.

International Search Report issued in Application Serial No. PCT/US2014/069724 dated Mar. 12, 2015.

Schwarz et al., "Unbiased Coherent-to-Diffuse Ration Estimation for Dereverberation", Multimedia Communications and Signal Processing, 2014 14th International Workshop on Acoustic Signal Enhancement (IWAENC), 2014.

Wolff et al., "Influence of blocking matrix design on microphone array postfilters", Acoustic Signal Processing Research.

* cited by examiner

300

SPEECH ENHANCEMENT USING A PORTABLE ELECTRONIC DEVICE

CROSS-REFERENCE TO RELATED APPLICATION

This application is a U.S. National Stage of International Patent Application No. PCT/US2014/069724, filed on 11 Dec. 2014. The disclosure of which is incorporated herein by reference in its entirety.

TECHNICAL FIELD

This disclosure relates to speech enhancement and, more particularly, to a method for speech enhancement in a portable electronic device.

BACKGROUND

Smartphones and other portable electronic devices are typically operated in one of two ways. In some cases the smartphone may be held in front of the head so that the speaker can see the display (i.e., "screen speaking mode"). In noisy environments, however, the user may hold the device close to the head (i.e., "ear-held mode", e.g. in telephony applications) in order to have the loudspeaker very close to the ear. For controlling speech enhancement algorithms, these are quite different use cases. For example, in screen speaking mode, both microphones may receive the speech signal with similar quality. In contrast, in ear-held mode the microphone on the bottom may exhibit a higher speech level than the microphone on the top of the device. Hence, the top microphone may be used as a noise reference microphone.

SUMMARY OF DISCLOSURE

In one implementation, a method, in accordance with this disclosure, may include receiving an audio signal at a portable electronic device having a first microphone and a second microphone. The method may also include receiving an input from a proximity detector associated with the portable electronic device and controlling a processing component associated with at least one of the first microphone and the second microphone based upon, at least in part, the input at the proximity detector.

One or more of the following features may be included. In some embodiments, controlling may include deactivating at least one speech detector. The at least one speech detector may include a coherent to diffuse ratio ("CDR") and/or a signal power ratio ("SPR"). In some embodiments, controlling may include controlling one or more adaptive filters configured to process all inputs associated with the first microphone and/or the second microphone. The one or more adaptive filters may be configured to cancel a speech signal in at least one of the microphone input signals to obtain a noise reference signal. The one or more adaptive filters may be configured to cancel a noise reference signal from at least one microphone input signal. In some embodiments, controlling may include controlling greater than two microphones. In some embodiments, the first microphone may be located at the bottom of the portable electronic device and the second microphone may be located at the top of the portable electronic device. Controlling may occur during run-time.

In another implementation, a system for speech enhancement is provided. The system may include a portable electronic device having one or more processors, a first microphone, and a second microphone. In some embodiments, the portable electronic device may be configured to receive an audio signal and to receive an input from a proximity detector associated with the portable electronic device. The one or more processors may be further configured to control a processing component associated with at least one of the first microphone and the second microphone based upon, at least in part, the input from the proximity detector.

One or more of the following features may be included. In some embodiments, controlling may include deactivating at least one speech detector. The at least one speech detector may include a coherent to diffuse ratio ("CDR") and/or a signal power ratio ("SPR"). In some embodiments, controlling may include controlling one or more adaptive filters configured to process all inputs associated with the first microphone and/or the second microphone. The one or more adaptive filters may be configured to cancel a speech signal in at least one of the microphone input signals to obtain a noise reference signal. The one or more adaptive filters may be configured to cancel a noise reference signal from at least one microphone input signal. In some embodiments, controlling may include controlling greater than two microphones. In some embodiments, the first microphone may be located at the bottom of the portable electronic device and the second microphone may be located at the top of the portable electronic device. Controlling may occur during run-time.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION OF THE EMBODIMENTS

Embodiments provided herein are directed towards speech enhancement on smartphones having multiple microphone arrangements where, for example, one microphone is on the bottom edge of the device (e.g., main microphone) and the other microphone is at the top edge of the device (e.g., secondary microphone near the loudspeaker). Additionally and/or alternatively, embodiments of speech enhancement process 10 described herein may use the proximity detector of the smartphone (available in smartphones to deactivate the touchscreen in ear-held mode) in order to switch the control algorithm of speech enhancement.

Figure 1:
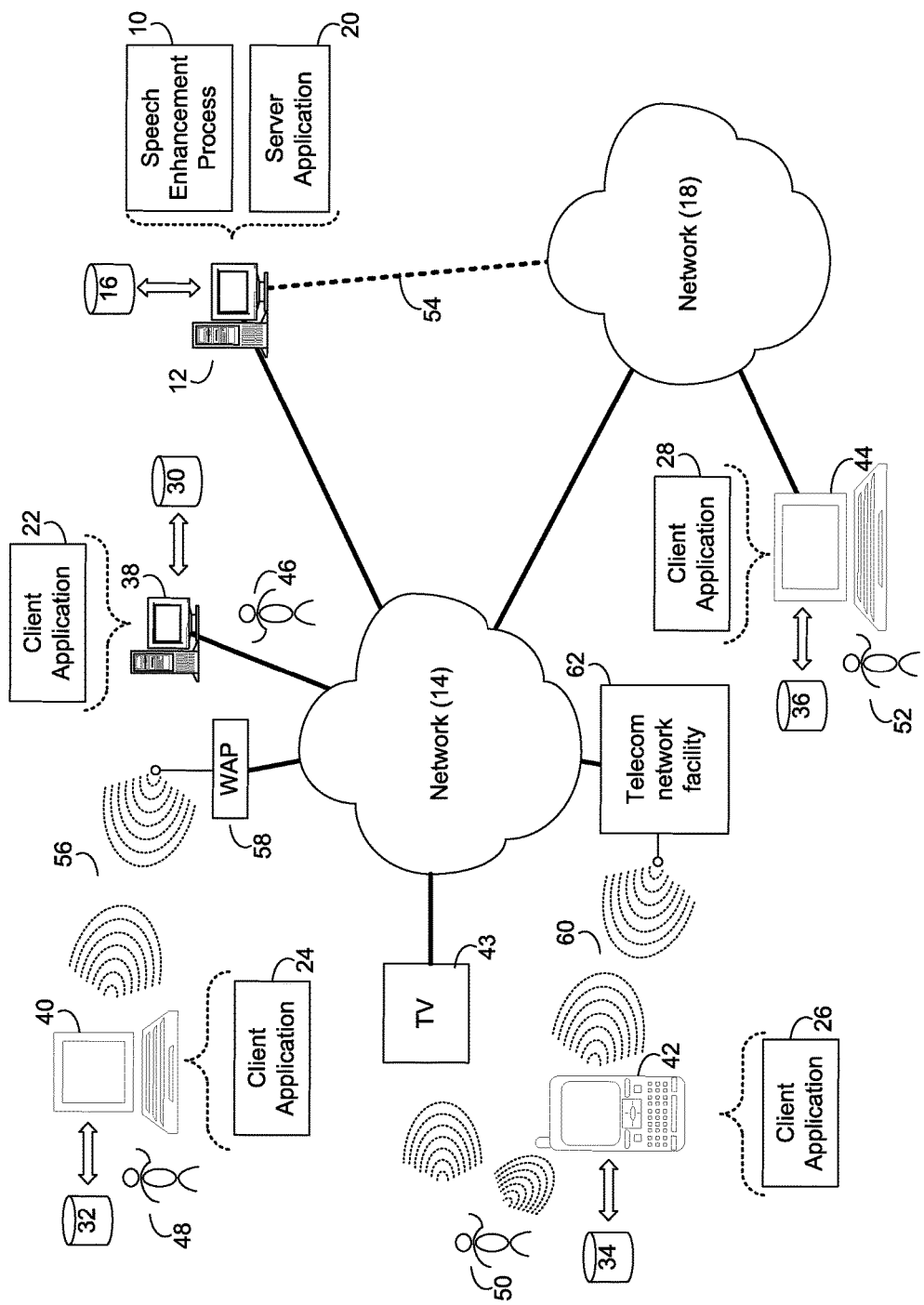
FIG. 1 is a diagrammatic view of a speech enhancement process in accordance with an embodiment of the present disclosure.

Referring to FIG. 1, there is shown a speech enhancement process 10 that may reside on and may be executed by any of the devices shown in FIG. 1, for example, computer 12, which may be connected to network 14 (e.g., the Internet or a local area network). Server application 20 may include some or all of the elements of speech enhancement process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multiprocessor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

Figure 2:
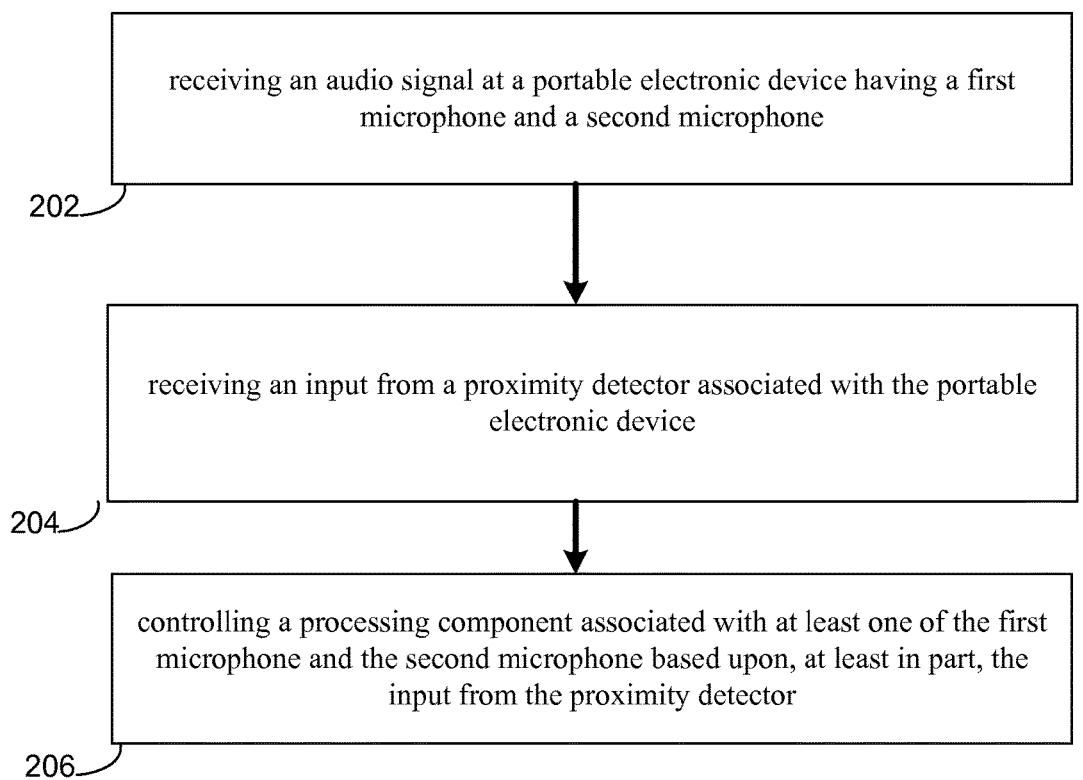
FIG. 2 is a flowchart of a speech enhancement process in accordance with an embodiment of the present disclosure.

As will be discussed below in greater detail in FIGS. 2-4, speech enhancement process 10 may include receiving (202) an audio signal at a portable electronic device having a first microphone and a second microphone. Embodiments may also include receiving (204) an input at a proximity detector associated with the portable electronic device and controlling (206) a processing component associated with at least one of the first microphone and the second microphone based upon, at least in part, the input at the proximity detector.

The instruction sets and subroutines of speech enhancement process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, speech enhancement process 10 may be accessed and/or activated via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, television 43, notebook computer 44, a server (not shown), a data-enabled, cellular telephone (not shown), and a dedicated network device (not shown).

One or more of client applications 22, 24, 26, 28 may be configured to effectuate some or all of the functionality of speech enhancement process 10. Accordingly, speech enhancement process 10 may be a purely server-side application, a purely client-side application, or a hybrid server-side/client-side application that is cooperatively executed by one or more client applications 22, 24, 26, 28 and speech enhancement process 10.

Client electronic devices 38, 40, 42, 43, 44 may each execute an operating system, examples of which may include but are not limited to Apple iOS™, Microsoft Windows™, Android™, Redhat Linux™, or a custom operating system. Each of client electronic devices 38, 40, 42, 43, and 44 may include one or more microphones and/or speakers configured to implement speech enhancement process 10 as is discussed in further detail below.

Users 46, 48, 50, 52 may access computer 12 and speech enhancement process 10 directly through network 14 or through secondary network 18. Further, computer 12 may be connected to network 14 through secondary network 18, as illustrated with phantom link line 54. In some embodiments, users may access speech enhancement process 10 through one or more telecommunications network facilities 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and smart phones to be interconnected using a short-range wireless connection.

Smart phone 42 is shown wirelessly coupled to network 14 via wireless communication channel 60 established between smart phone 42 and telecommunications network facility 62, which is shown directly coupled to network 14.

The phrase "telecommunications network facility", as used herein, may refer to a facility configured to transmit, and/or receive transmissions to/from one or more mobile devices (e.g. cellphones, etc). In the example shown in FIG. 1, telecommunications network facility 62 may allow for communication between TV 43, cellphone 42 (or television remote control, etc.) and server computing device 12.

Figure 3:
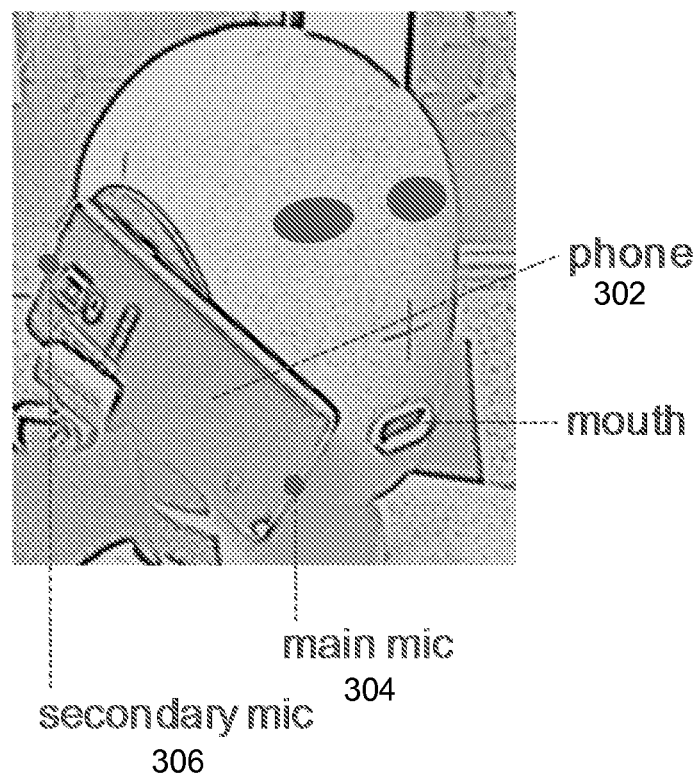
FIG. 3 is a diagrammatic view of a system configured to implement a speech enhancement process in accordance with an embodiment of the present disclosure.

Referring also to FIG. 3, an example embodiment 300 depicting a use case consistent with the teachings of speech enhancement process 10 is provided. In this particular embodiment, a smartphone 302 is shown having a first microphone 304 and a second microphone 306. It should be noted that any number of microphones may be employed without departing from the scope of the present disclosure (e.g. more than two microphones, etc.).

Previous work has tried to compromise the control mechanisms within speech enhancement in order to not degrade performance in one scenario versus the other or it has been limited to one use case.

In contrast, embodiments of speech enhancement process 10 may be configured to utilize dedicated control mechanisms for both cases (e.g., ear-held and screen speaking mode) and to switch the way these control mechanisms may be combined depending on the result of an external proximity sensor associated with the smartphone. It should be noted that any suitable proximity sensor may be used without departing from the scope of the present disclosure (e.g. IR-based sensors, etc.).

In some embodiments, speech enhancement process 10 may include receiving an input from a proximity detector associated with the portable electronic device and controlling a processing component associated with at least one of the first microphone and the second microphone based upon, at least in part, the input from the proximity detector. In some embodiments, this may include deactivating at least one speech detector. Additionally and/or alternatively, speech enhancement process 10 may be configured to use any number of microphones.

In some embodiments, speech enhancement process 10 may incorporate a plurality of speech detectors for control purposes. Some of these may include, but are not limited to, the coherent-to-diffuse signal power ratio ("CDR"), which detects desired speech based on the coherence between the two microphone signals; and the signal power ratio ("SPR"), which is the ratio of the powers at the two microphones. A high CDR typically indicates that there is a strong direct sound component (presumably due to the user speaking) and a low CDR may indicate that there is only noise or reverberation present. In contrast, a high SPR generally indicates that the user is speaking and a low SPR indicates that there is only noise present.

These particular speech detection approaches are discussed below in further detail.

The signal power ratio (SPR) of two microphone signals $x_1$ and $x_2$ is defined as:

$$SPR(\omega) = \frac{\Phi_{x_1}(\omega)}{\Phi_{x_2}(\omega)}$$

where $\Phi_{x_1}(\omega)$ and $\Phi_{x_2}(\omega)$ are the power spectral densities of the two signals.

The coherence $\Gamma_x(\omega)$ of two microphone signals $x_1$ and $x_2$ at frequency $\omega$ is defined as:

$$\Gamma_x(\omega) = \frac{\Phi_{x_1,x_2}(\omega)}{\Phi_x(\omega)}$$

where $\Phi_x$ denotes the power spectral density (under the assumption that the power of the two signals is the same, i.e. $\Phi_x(\omega) = \Phi_{x_1}(\omega) \approx \Phi_{x_2}(\omega)$) and $\Phi_{x_1 x_2}(\omega)$ denotes the cross-power spectral density.

The coherence of the direct sound of a speaker (i.e. the first waves that hit the microphones without reflections by the wall or other objects) is:

$$\Gamma_S(\omega) = e^{j2\pi\omega\Delta_t}$$

where $\Delta_t$ denotes the time difference with which the waves arrive at the two microphones.

The coherence of a diffuse noise field (valid for environmental noise and reverberation) is:

$$\Gamma_x(\omega) = \mathrm{sinc}\left(2\pi\omega\frac{d}{c}\right)$$

where d denotes the microphone distance and where c denotes the speed of sound.

The Coherent-to-Diffuse Ratio (CDR) is generally defined as:

$$CDR(\omega) = \frac{\Gamma_N(\omega) - \Gamma_X(\omega)}{\Gamma_X(\omega) - \Gamma_S(\omega)}$$

where $\Gamma_X(\omega)$ is the measured coherence at the two microphones, $\Gamma_S(\omega)$ is the coherence of direct sound (see paragraph [0035]) and $\Gamma_N(\omega)$ is the coherence of a diffuse noise field.

In practice, the CDR can be calculated as is described in:
1. M. Jeub, C. Nelke, C. Beaugeant, and P. Vary, "Blind estimation of the coherence-to-diffuse ratio from noisy speech signals", 19$^{th}$ European Signal Processing Conference, 2011.
2. O. Thiergart, G. Del Galdo, and E. A. P. Habets, "On the spatial coherence in mixed sound fields and its application to signal-to-diffuse ratio estimation," The Journal of the Acoustical Society of America, vol. 132, pp. 2337, 2012.
3. A. Schwarz, W. Kellermann, "Unbiased coherent-to-diffuse ratio estimation for dereverberation," 14th International Workshop on Acoustic Signal Enhancement (IWAENC), 2014

In some embodiments, speech enhancement process 10 may be configured to detect a screen-speaking mode. In screen speaking mode the desired speech signal may be detected with the CDR. Here, the SPR may not provide much helpful information to detect desired speech as both microphones pick up similar signal powers.

In some embodiments, speech enhancement process 10 may be configured to detect an ear-held mode. In ear-held mode the SPR may be used to detect user speech as the top microphone may be shaded by the head. The CDR may not provide reliable results here as the two microphone signals are too different. Moreover, the CDR bears the risk that an interfering speaker nearby yields higher CDR values than the user itself.

Accordingly, it may be beneficial to deactivate the effect of CDR in ear-held mode and to deactivate the effect of SPR in the screen speaking mode. As these modes cannot be distinguished based on the observed microphone signals embodiments of the present disclosure may use external information (e.g., the proximity sensor) to steer the internal control of speech enhancement.

In some embodiments, speech enhancement process 10 may utilize an adaptive filter with adaptation control and, in some cases, adaptive step size control. The adaptation control and/or adaptive step size control may be performed based on CDR or SPR measures or both (possibly weighted). The smart phone proximity sensor may be used to switch between CDR and SPR based control (or a weighting of the two measures with the weight changing in dependency of the proximity sensor). The switching may be described as switching between ear-held and screen speaking mode.

For example, if the user is talking, the signal power at the main microphone 304 may be much higher than that of secondary microphone 306. The CDR does not provide reliable results here as the two microphone signals are too different. In this example, speech enhancement process 10 may rely on SPR for adaptation control.

Additionally and/or alternatively, if the SPR at main microphone 304 and secondary microphone 306 is comparable, SPR may not be appropriate for discrimination. However, CDR may be reliable here for adaptation control.

In some embodiments, the adaptive filter described herein may be any suitable adaptive filter. Some of these may include, but are not limited to, a noise canceller with internal or external noise reference signals, and/or a blocking matrix that may be calculated adaptively. For example, with an adaptive filter (such as in robust adaptive beamforming).

It should be noted that the microphones associated with the embodiments of the present disclosure may be of any suitable design. Further, the microphones may be located in numerous electronic devices in addition to the devices described herein. For example, one or more microphones may be located within a remote control device, a cellphone, tablet computing device, television, set-top-box, receiver, an in-vehicle system, and a hands-free telephone system, etc.

Embodiments of speech enhancement process 10 may utilize a proximity sensor that may be integrated in most modern smart phones and some tablets. Such a proximity sensor typically makes use of 1) face detection or 2) the specific absorption rate ("SAR") of the human body to detect proximity of a user. Any suitable sensor (e.g., infrared) may be used without departing from the scope of the present disclosure.

Embodiments of speech enhancement process 10 may use information from the proximity sensor to enable/disable speech detectors. In general, speech detectors may be wideband (i.e. concern the whole signal with all its frequencies) or they may subband detectors that only cover a certain frequency range.

In some embodiments, speech enhancement process 10 may use information from the proximity sensor to control the processing of one or all of the microphones. Additionally and/or alternatively, speech enhancement process 10 may use information from the proximity sensor to control adaptive filters that process the inputs of some or all microphone inputs. Such an adaptive filter might be designed to block (i.e. cancel) the speech signal in one or several of the microphone input signals in order to obtain an "internal" noise reference signal (as it is done in the adaptive blocking matrix of a robust adaptive beamformer). The adaptive filter may also be configured to cancel a noise reference signal from one or several microphone input signals. In particular, the noise reference signal might be an "internal" reference that may be obtained by cancelling the speech signal (described above) or it may be an "external" reference that may be recorded with a noise reference microphone.

In some embodiments, speech enhancement process 10 may use the SPR and CDR as speech detectors to control the adaptive filters and/or the step size of adaptive filters. This is notable, as the adaptive filter for blocking the speech signal should be adapted during speech only (not on noise). Conversely, the adaptive filter for canceling a noise reference signal may be adapted on noise only or it may be "allowed" to adapt faster in noise only sections (i.e. a larger step size could be used in noise only sections and a smaller step size could be used in speech sections to prevent speech cancellation). This is in particular done individually for each frequency. Hence, the speech detectors may be subband detectors that decide for each frequency whether speech is present or not. This may lead to faster convergence of the adaptive filters, as speech may not always be present in all frequencies at the same time (e.g. vowels are mostly present in lower frequencies only/fricatives have much energy in higher frequencies).

Figure 4:
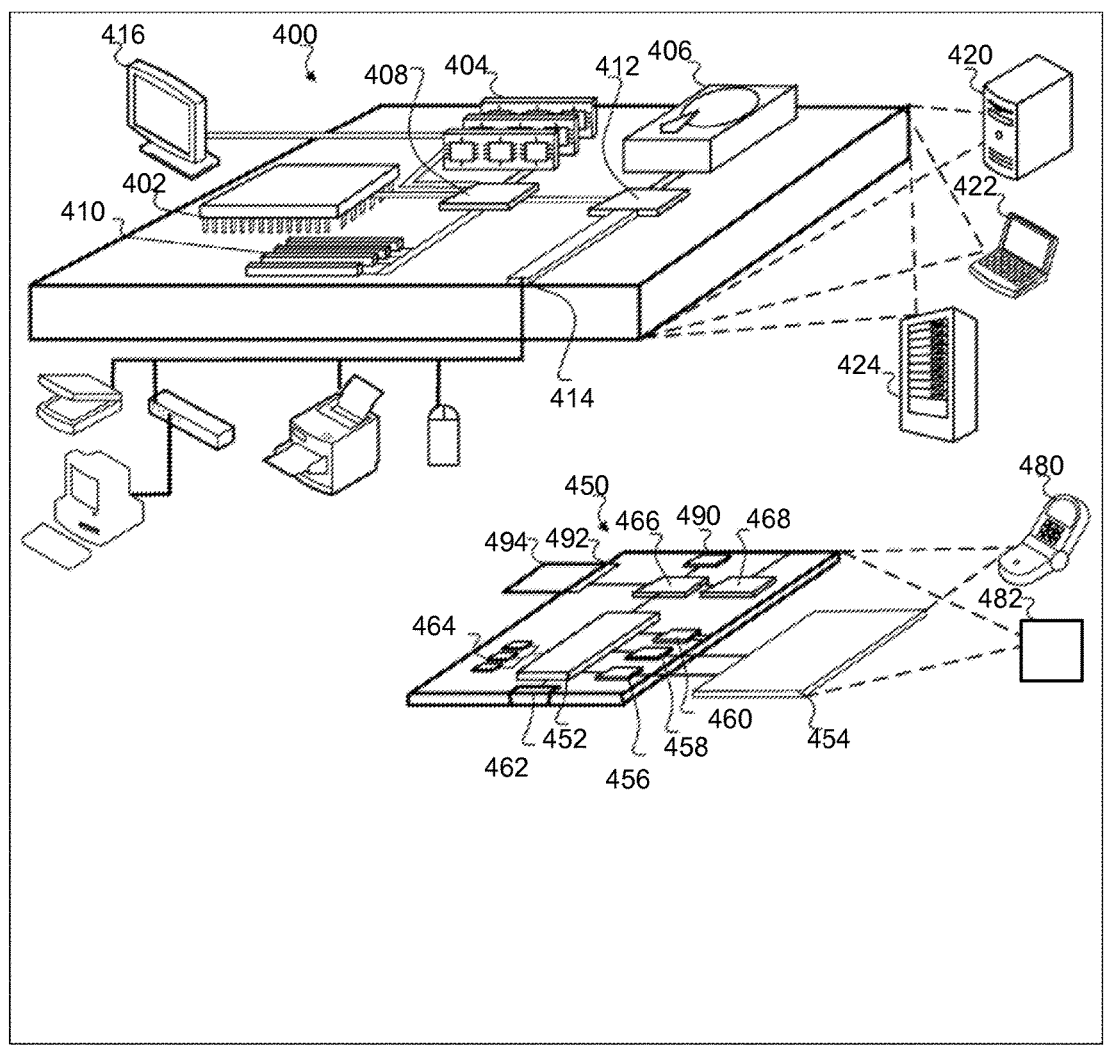
FIG. 4 shows an example of a computer device and a mobile computer device that can be used to implement the techniques described here.

Referring now to FIG. 4, an example of a generic computer device 400 and a generic mobile computer device 450, which may be used with the techniques described here is provided. Computing device 400 is intended to represent various forms of digital computers, such as tablet computers, laptops, desktops, workstations, personal digital assistants, servers, blade servers, mainframes, and other appropriate computers. In some embodiments, computing device 450 can include various forms of mobile devices, such as personal digital assistants, cellular telephones, smartphones, and other similar computing devices. Computing device 450 and/or computing device 400 may also include other devices, such as televisions with one or more processors embedded therein or attached thereto as well as any of the microphones, microphone arrays, and/or speakers described herein. The components shown here, their connections and relationships, and their functions, are meant to be exemplary only, and are not meant to limit implementations of the inventions described and/or claimed in this document.

In some embodiments, computing device 400 may include processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, may be interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

Memory 404 may store information within the computing device 400. In one implementation, the memory 404 may be a volatile memory unit or units. In another implementation, the memory 404 may be a non-volatile memory unit or units. The memory 404 may also be another form of computer-readable medium, such as a magnetic or optical disk.

Storage device 406 may be capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

High speed controller 408 may manage bandwidth-intensive operations for the computing device 400, while the low speed controller 412 may manage lower bandwidth-intensive operations. Such allocation of functions is exemplary only. In one implementation, the high-speed controller 408 may be coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 may include a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, may be interconnected using various buses, and several of the components may be mounted on a common motherboard or in other manners as appropriate.

Processor 452 may execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

In some embodiments, processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

In some embodiments, memory 464 may store information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

Computing device 450 may be implemented in a number of different forms, as shown in the figure. For example, it may be implemented as a cellular telephone 480. It may also be implemented as part of a smartphone 482, personal digital assistant, remote control, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   receiving an audio signal at a portable electronic device having a first microphone and a second microphone;
   receiving an input from a proximity detector associated with the portable electronic device; and
   controlling a processing component, including at least one speech detector, associated with at least one of the first microphone and the second microphone based upon, at least in part, the input from the proximity detector, wherein controlling includes switching between use of the at least one speech detector and a second speech detector based upon, at least in part, the input from the proximity detector.

2. The computer-implemented method of claim 1, wherein controlling further includes deactivating the at least one speech detector.

3. The computer-implemented method of claim 1, wherein one of the at least one speech detector and the second speech detector includes a coherent to diffuse ratio ("CDR").

4. The computer-implemented method of claim 1, wherein one of the at least one speech detector and the second speech detector includes a signal power ratio ("SPR").

5. The computer-implemented method of claim 1, wherein controlling further includes controlling one or more adaptive filters configured to process all inputs associated with the first microphone and the second microphone.

6. The computer-implemented method of claim 5, wherein the one or more adaptive filters are configured to cancel a speech signal in at least one of the microphone input signals to obtain a noise reference signal.

7. The computer-implemented method of claim 5, wherein the one or more adaptive filters are configured to cancel a noise reference signal from at least one microphone input signal.

8. The computer-implemented method of claim 1, wherein controlling further includes controlling one or more additional microphones associated with the portable electronic device.

9. The computer-implemented method of claim 1, wherein the first microphone is located at the bottom of the portable electronic device and the second microphone is located at the top of the portable electronic device.

10. The computer-implemented method of claim 1, wherein controlling occurs during run-time.

11. A system comprising:
    a portable electronic device having one or more processors, a first microphone, and a second microphone wherein the portable electronic device is configured to receive an audio signal and to receive an input from a proximity detector associated with the portable electronic device, the one or more processors further configured to control a processing component, including at least one speech detector, associated with at least one of the first microphone and the second microphone based upon, at least in part, the input from the proximity detector, wherein controlling includes switching between use of the at least one speech detector and a second speech detector based upon, at least in part, the input from the proximity detector.

12. The system of claim 11, wherein controlling further includes deactivating at least one speech detector.

13. The system of claim 11, wherein one of the at least one speech detector and the second speech detector includes a coherent to diffuse ratio ("CDR").

14. The system of claim 11, wherein one of the at least one speech detector and the second speech detector includes a signal power ratio ("SPR").

15. The system of claim 11, wherein controlling further includes controlling one or more adaptive filters configured to process all inputs associated with the first microphone and the second microphone.

16. The system of claim 15, wherein the one or more adaptive filters are configured to cancel a speech signal in at least one of the microphone input signals to obtain a noise reference signal.

17. The system of claim 15, wherein the one or more adaptive filters are configured to cancel a noise reference signal from at least one microphone input signal.

18. The system of claim 11, wherein controlling further includes controlling one or more additional microphones associated with the portable electronic device.

19. The system of claim 11, wherein the first microphone is located at the bottom of the portable electronic device and the second microphone is located at the top of the portable electronic device.

20. The system of claim 11, wherein controlling occurs during run-time.

* * * * *